United States Patent  
Robertson

(10) Patent No.: US 7,400,971 B2
(45) Date of Patent: Jul. 15, 2008

(54) TAILGATE AJAR AND SECURITY MONITORING SYSTEM

(75) Inventor: Timothy H. Robertson, Allen Park, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 720 days.

(21) Appl. No.: 10/813,441

(22) Filed: Mar. 31, 2004

(65) Prior Publication Data
US 2005/0222732 A1  Oct. 6, 2005

(51) Int. Cl.
B60R 25/10 (2006.01)
G06F 17/00 (2006.01)

(52) U.S. Cl. .............. 701/207; 701/1; 340/426.24; 49/13

(58) Field of Classification Search .............. 701/207, 701/1, 49, 36; 340/426.24, 438, 457, 459, 340/460, 461, 687; 49/13, 14, 26
See application file for complete search history.

(56) References Cited

U.S. PATENT DOCUMENTS 4,123,745 A  10/1978  Gurgone
5,289,534 A * 2/1994 Lester et al. ........... 379/102.06
5,563,483 A * 10/1996 Kowall et al. ............... 318/283
5,708,409 A * 1/1998 Schwimmer et al. ... 340/426.28
5,713,621 A * 2/1998 Krenkel et al. ........... 296/186.4
6,137,419 A * 10/2000 Lennox et al. .............. 340/687
6,232,873 B1 5/2001 Dilz et al.
6,727,806 B1 * 4/2004 Massie et al. ......... 340/426.24
7,088,045 B1 * 8/2006 Zich ............................ 315/84
7,128,019 B2 * 10/2006 Hensel ..................... 116/35 R

* cited by examiner

Primary Examiner—Tan Q Nguyen
(74) Attorney, Agent, or Firm—Foley & Lardner LLP

(57) ABSTRACT

An embodiment of the present invention is a reconfigurable cargo door/tailgate position indicator assembly adapted to indicate a position of a cargo door/tailgate including a processor configured to receive input from a door/gate monitoring mode input device, receive input from a door/gate position input device, analyze the input from the door/gate monitoring mode input device, analyze the input from the door/gate position input device, and output a signal to a door/gate position indicator to control the door/gate position indicator based on the analysis of the input from the door/gate monitoring mode input device and the input from the door/gate position input device. In another embodiment of the present invention, there is a reconfigurable security device configured to selectively take into account the position of a cargo door/tailgate to determine whether a vehicle's security has been breached.

29 Claims, 10 Drawing Sheets

TAILGATE AJAR AND SECURITY MONITORING SYSTEM

BACKGROUND OF THE INVENTION

Trucks and vehicles with rear cargo areas (such as, for example, hatchbacks, SUVs, etc.) may sometimes be configured with sensors that determine and/or output a signal indicative of whether a tailgate (e.g., in the case of a pick-up truck) or a cargo door (e.g., in the case of another type of vehicle) is ajar/open. By way of example, vehicles of such a configuration may have an indicator to indicate to the driver that the cargo door/tailgate is ajar. Such an indicator may be, for example, a light on the dashboard of the vehicle or an auditory alarm to indicate that the cargo door/tailgate is ajar.

The present inventor has determined that there are instances when a driver of such a vehicle may not want to receive sensory input from the indicator indicating that the cargo door/tailgate is ajar because the driver intentionally has the cargo door/tailgate ajar/open.

Security systems may be utilized on vehicles that have devices that determine whether or not a cabin door and/or a cargo door/tailgate is ajar, and, depending on whether the security system is activated, may output or otherwise initiate an alarm if the system determines that the cabin door and/or tailgate/cargo door is ajar when activated. The present inventors have determined that there are some instances when a driver of the vehicle may seek to secure a cabin of the vehicle against theft, but may not want to secure a cargo area of a vehicle with a security system. By way of example, an owner of a pick-up truck may have the tailgate down because he or she is transporting long pieces of lumber in the truck that extend past the interior dimensions of the truck, (but properly attached to the truck bed) and, thus the tailgate is open, and thus ajar. (Some pick-ups have hard or soft caps covering the cargo area of the pick-up, such as cap 1000 shown in FIG. 3. Thus, the cargo area may be secured by the closing of the tailgate. The invention described below will work with vehicles with a hard cap, a soft cap, or with no cap.) However, the driver may still want to secure the cabin from theft. In security devices that monitor the status of the cabin doors and the cargo door/tailgate, activation of the security system would result in an alarm being initiated because the tailgate of the pick-up truck was ajar.

In view of the above, the present inventor has invented novel and useful devices to provide an owner/driver of a vehicle with the option to configure a cargo door/tailgate position indication system and/or a security system in a manner that meets the desires/needs of the user/driver.

SUMMARY OF THE INVENTION

According to one aspect of the invention, the invention provides a reconfigurable cargo door/tailgate position indicator assembly adapted to indicate a position of a cargo door/tailgate, including a processor configured to receive input from a door/gate monitoring mode input device, receive input from a door/gate position input device, analyze the input from the door/gate monitoring mode input device, analyze the input from the door/gate position input device, and output a signal to a door/gate position indicator to control the door/gate position indicator based on the analysis of the input from the door/gate monitoring mode input device and the input from the door/gate position input device.

According to another aspect of the invention, the invention provides a reconfigurable security device configured to selectively take into account the position of a cargo door/tailgate to determine whether a vehicle's security has been breached.

DETAILED DESCRIPTION OF SOME OF THE EMBODIMENTS

Figure 1:
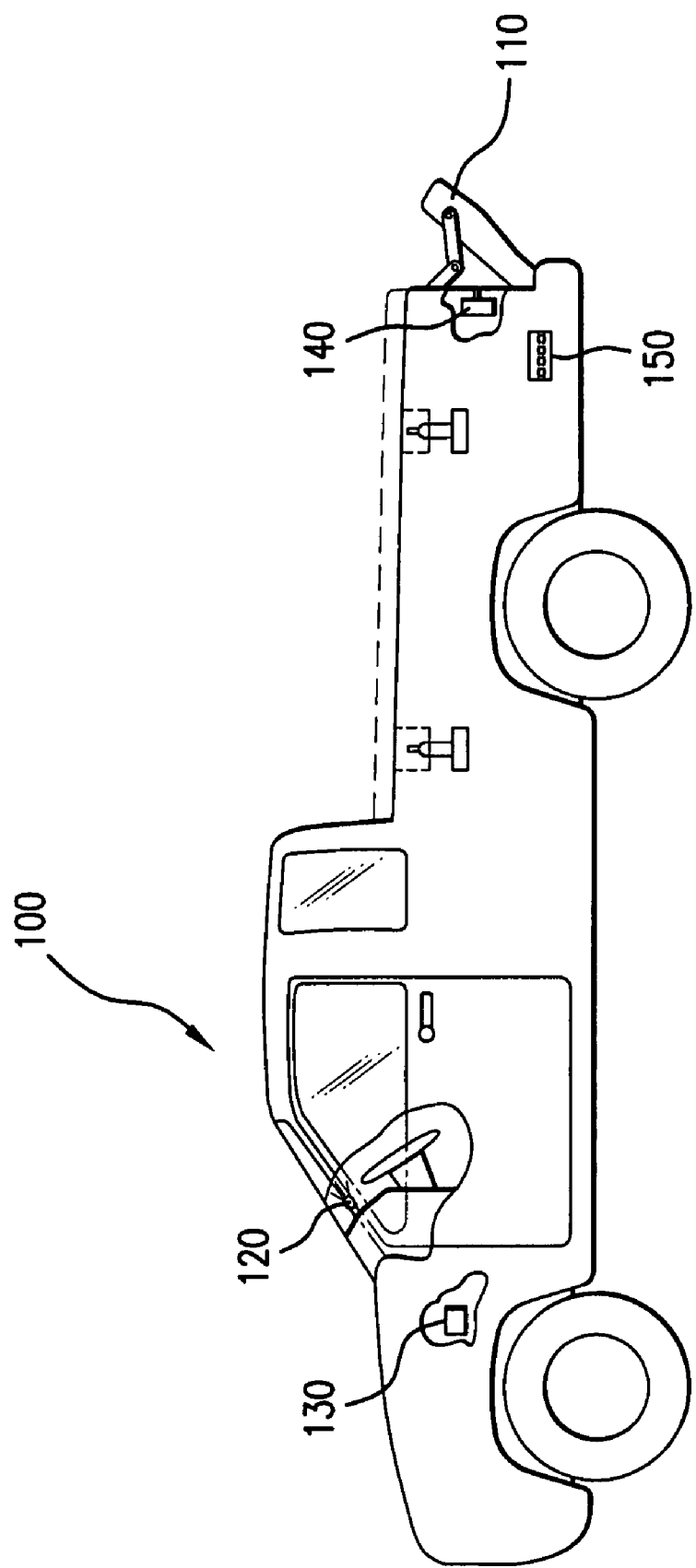
FIG. 1 shows a vehicle utilizing an embodiment of the reconfigurable cargo door/tailgate position indicator assembly according to the present invention.
Figure 2:
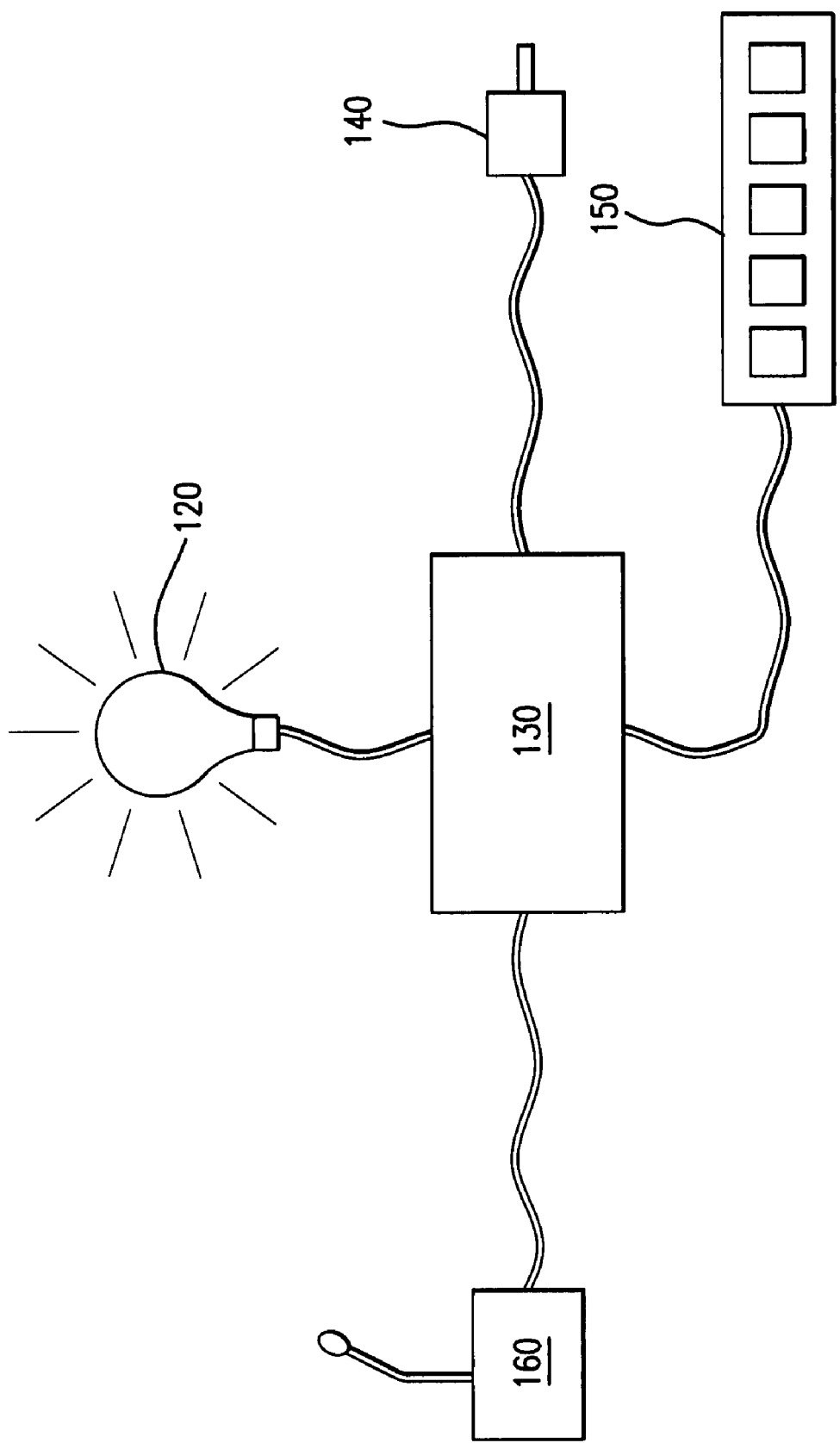
FIG. 2 shows a reconfigurable cargo door/tailgate position indicator assembly according to an embodiment of the present invention.
Figure 9:
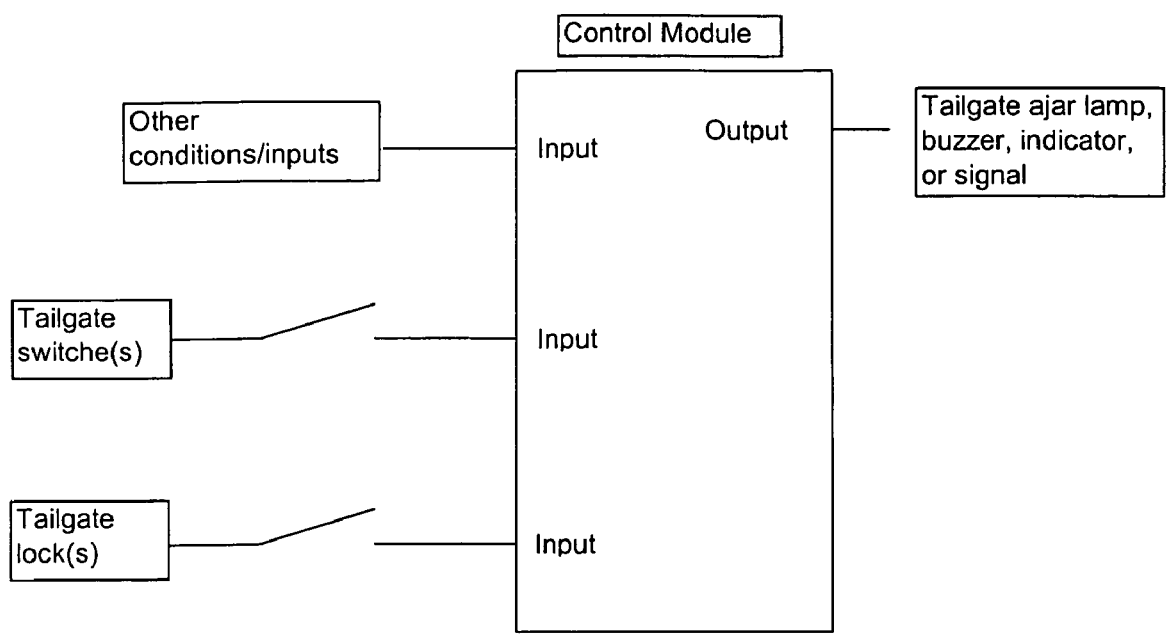
FIG. 9 shows an input-output diagram for a control module/processor according to the present invention.

In a first embodiment of the present invention, as may be seen in FIGS. 1, 2 and 9, there is a vehicle 100 with a reconfigurable cargo door/tailgate position indicator assembly ("reconfigurable indicator assembly") that is adapted to monitor positions of a cargo door/tailgate 110. The vehicle may include a cargo door or a tailgate 110, a door/gate position indicator 120 and a processor 130. The vehicle 100 of the first embodiment may further include a door/gate position input device 140 adapted to receive input regarding whether the door/gate is ajar and output information indicative of whether the door/gate is ajar. Thus, in the first embodiment of the invention, the processor may be adapted to receiving input regarding the position door/gate 110. In the first embodiment of the invention, the vehicle 100 also includes a door/gate monitoring mode input device 150 that is in communication with the processor 130. The door/gate monitoring mode input device 150 is adapted to receive input from a user of the vehicle 100 indicative of his or her desire or lack of desire to have the reconfigurable indicator assembly operate in a reconfigured mode and output information to the processor 130 indicative of the input from the user into the door/gate monitoring mode input device 150. The processor 130 analyzes the input from the door/gate monitoring mode input device 150 and outputs a signal to and/or otherwise controls the door/gate position indicator 120 to control the door/gate position indicator based on the analysis of the input from the door/gate monitoring mode input device 150. In the first embodiment of the invention, if the processor receives input from the door/gate monitoring mode input device 150 indicative of a user's desire to have the reconfigurable indicator assembly not operate in the reconfigured mode, and the processor receives input from the door/gate position input device 140 indicating that the door/gate is ajar, the processor commands the door/gate position indicator 120 to indicate that the door/gate 110 is ajar. If, on the other hand, the processor 130 receives input from the door/gate monitoring mode input device 150 indicative of a user's desire to have the reconfigurable indicator assembly operate in the reconfigured mode, and thus to have the reconfigurable indicator assembly operate in a state where the door/gate 110 is ajar but the door/gate position indicator 120 does not indicate that the door/gate 110 is ajar, the processor controls the door/gate position indicator 120 to indicate that the door/gate 110 is not ajar even though the door/gate 110 is ajar. Specific details of some of the embodiments of the present invention will now be described.

In an exemplary embodiment of the present invention, the device includes the processor 130 which may be of the configuration as just described. The processor 130 may be adapted to receive input, analyze the input, and output a signal. In an exemplary embodiment, the processor may be adapted to receive input from the door/gate monitoring mode input device 150 and also to receive input from the door/gate position input device 140. The input from the door gate monitoring mode input device 150 may be indicative of the user's desire to reconfigure the reconfigurable indicator assembly. That is, as discussed above, a user/driver of the vehicle 100 may want the door/gate position indicator 120 to indicate that the door/gate is not ajar when in fact the door/gate is ajar. The processor 130, according to such an embodiment, may be configured to receive such input and control the indicator 120 to satisfy the user's desires.

It is noted here that when it is said that the indicator 120 indicates that the door/gate is not ajar/not open, it is meant both the non-indication that the door/gate is not ajar (e.g., in embodiments where the indicator 120 is an indicator that illuminates the words "tailgate ajar" when the tailgate is ajar, lack of illumination (e.g., the light is out) shall be considered an instance where the indicator 120 indicates that the tailgate is not ajar) and the affirmative indication that the door/gate is not ajar (e.g., in embodiments where the indicator 12 is an indicator that illuminates the words "tailgate not ajar," when the tailgate is not ajar.)

In describing the reconfigurable indicator assembly according to the present invention, "normal mode" of operation will mean that the reconfigurable indicator assembly operates in a mode where the indicator 120 indicates the true state of the door/gate 110. On the other hand, "user controlled mode" of operation will mean that the reconfigurable indicator assembly operates in a mode different than the "normal mode."

The door/gate monitoring mode input device 150 according to an exemplary embodiment of the present invention includes a switch that the user may toggle to input his or her desired monitoring regime. By way of example, the switch may be a two position switch, where the user positions the switch in the first position to place the reconfigurable indicator assembly into the "normal mode" of door/gate position display operation. The user may move the switch to the second position to input his or her desire to place the reconfigurable indicator assembly into the "user controlled mode" of door/gate display operation. The switch may output a signal to the processor 130 indicative of the input inputted into the door/gate monitoring mode input device 150. In another embodiment of the present invention, the door/gate monitoring mode input device 150 may comprise a single position, spring-loaded switch where the user presses the switch a first time to place the reconfigurable indicator assembly into the "normal mode" and then presses the switch again to place the reconfigurable device into the "user controlled mode." As will be understood by one of ordinary skill in the art, such a switch may be a switch that simply closes a circuit and/or opens a circuit, depending on the position of the switch. In such an embodiment, an open circuit may be indicative of a user's desire to have the reconfigurable indicator assembly operate in the "normal mode," while a closed circuit may be indicative of a user's desire to operate the reconfigurable device in the "user controlled mode." It will be seen by one of ordinary skill in the art that when the circuit is open, the switch of the door/gate monitoring mode input device may not permit current to flow from the switch to the processor 130 and from the processor 130 to the switch thus completing the circuit. Still, the door/gate position input device is to be considered to output information indicative of input from the user as to the user's desired mode of operation. That is, in embodiments where the door/gate position input device is configured to output a signal only when a user provides input into the device to place the reconfigurable indicator assembly into the "user controlled mode" the door/gate position input device shall be considered to output information indicative of the user's desire regarding which mode of operation the reconfigurable indicator assembly should operate in, even though a user has not affirmatively utilized the door/gate position input device to input his or her desired mode of operation. That is, embodiments of the reconfigurable indicator assembly may be considered to receive output from the door/gate position input device even when no signal is received. (In such embodiments, the processor may default to the "normal mode" of operation and/or, alternatively, may default to the "user controlled mode" of operation.)

In some embodiments of the present invention, any device, method, or system that may be used to receive and output information indicative of the mode in which a user desires the reconfigurable indicator assembly to operate may be utilized to practice some embodiments of the present invention. By way of example and not by way of limitation, a key switch, an IR receiver, a touch pad code receiver, etc., may be used in some embodiments of the invention.

Exemplary embodiments of the invention utilizing a door/gate position input device 140 may also utilize a switch as structurally described above. In such embodiments, by way of example, if the door/gate 110 is closed, a circuit may be closed so that the door/gate position input 140 device outputs information indicative that the door/gate is closed. When the door/gate 110 is open, the circuit, by way of example, is broken, and thus the door/gate position input device 140 outputs information indicative that the door/gate is ajar. Again, as is the case with the door/gate monitoring mode input device 150, lack of a signal from the door/gate position input device 140 may be considered output from the door/gate input device 140 indicative of a position of the door/gate.

Indeed, in some embodiments of the present invention, any device, method, or system that may be used to determine and/or otherwise indicate the position of a door/gate and/or determine whether a door/gate is ajar, may be utilized to practice some embodiments of the present invention.

The processor 130 according to an exemplary embodiment of the present invention, as noted above, is adapted to receive and analyze input from the door/gate monitoring mode input device 150 and receive and analyze input from the door/gate position input device 140. The processor may be further adapted to output the signal, based upon this analysis, to a door/gate position indicator 120 to control the door/gate position indicator 120. Thus, in an exemplary embodiment of the invention, if the analysis by the processor of the input from the door/gate monitoring mode input device 150 results in a determination that a user has inputted his or her desire to operate the reconfigurable door/gate position or indicator assembly in the normal mode, and the analysis of the input from the door/gate position input device 140 results in a determination that the door/gate 110 is ajar, the processor controls the indicator 120 to indicate that the door/gate is ajar. Conversely, if the analysis of the input from the door/gate monitoring mode input device 150 results in a determination that the user desires the reconfigurable door/gate position indicator assembly to operate in the "user controlled mode," (or, as also used herein, the "reconfigured mode") and the analysis of the input from the door/gate position input device results in a determination that the door/gate 110 is ajar, the processor controls the indicator 120 to indicate that the door/gate is not ajar.

Still further, in an exemplary embodiment of the embodiment, just described, when the processor 130 determines that the user of the vehicle desires, based on the input from the door/gate monitoring mode input device 150, to place the reconfigurable cargo door/tailgate position indicator assembly into "the user controlled mode," the processor controls the door/gate position indicator 120 to indicate that the cargo door/tailgate 110 is not ajar, regardless of whether or not the door/gate 110 is ajar. In another exemplary embodiment, when the processor determines that the user desires the reconfigurable door/gate position indicator assembly to operate in the "user controlled mode" the processor controls the door/gate position indicator 120 to indicate the opposite of the true position of the door/gate 110. That is, if the door/gate 110 is ajar the indicator 120 will indicate that the door/gate 110 is not ajar/not indicate that the door/gate 110 is ajar, and if the door/gate 110 is not ajar, the indicator 120 will indicate that the door/gate is ajar.

In other exemplary embodiments of the present invention, the processor 130 is adapted to change the state of an indicator 130 after the processor determines that a user desires the reconfigurable position indicator assembly to operate in the "user control mode." In an exemplary scenario (of which the present invention includes a processor 130 adapted to meet), the processor first determines that the door/gate 110 is ajar and controls the indicator 120 to indicate such. Then, the processor receives input from the door/gate monitoring mode input device 150 indicative of a user's desire for the reconfigurable door/gate position indicator assembly to operate in the "user control mode," and thus the processor changes the state of the indicator 120 to indicate that the door/gate 110 is not ajar when in fact the door/gate 110 is ajar. The converse exemplary scenario also applies (i.e., the door/gate 110 is not ajar and the indicator 120 indicates such, and then the processor changes the state of the indicator 120 upon receipt of input from the door/gate monitoring mode input device 150 to operate in the "user controlled mode" and then the processor 130 controls the indicator 120 to indicate that the door/gate 110 is ajar.)

As may be seen from the above descriptions, some embodiments of the present invention may operate to control the door/gate position indicator 120 to indicate that the door/gate 110 is not ajar when, in fact, the door/gate 110 is ajar, but the indicator is controlled so that when the door/gate 110 is not ajar the indicator also indicates that the door/gate 110 is not ajar. That is, by way of example, the processor according to the present invention may be adapted to override an indication that the door/gate 110 is ajar. In this regard, an exemplary embodiment of the present invention includes a processor 130 that is adapted to receive input from a door/gate monitoring mode input device 150 as well as from a door/gate position input device 140. The processor according to this embodiment includes logic to analyze the input from the door/gate position input device 140 and to determine whether or not the door/gate 110 is ajar based on the input from the position input device 140. If the analysis of the input from the door/gate position input device 140 results in a determination that the door/gate is not ajar, the processor 130 maintains the state of the door/gate position indicator 120 and/or controls the indicator 120 to indicate that the door/gate 110 is not ajar. In an exemplary embodiment, the logic of the processor 130 then continues in a loop, periodically assessing input from the door/gate position input device 140. This loop may continue until the processor receives input from the door/gate position input device 140 indicative of the door/gate 110 being ajar and determines that the door/gate 110 is ajar based on this input. Then (and in some exemplary embodiments, only then), the processor 130 proceeds to analyze input from the door/gate monitoring mode input device 150. This analysis may include a determination that the output from the door/gate monitoring mode input device 150 is indicative of input into the door/gate monitoring mode input device 150 of input to reconfigure the reconfigurable cargo door/tailgate position indicator assembly (e.g., place the assembly in the "user controlled mode"). If the analysis of the input from the door/gate monitoring mode input device 150 results in the determination that the output from the device 150 is indicative of input into the device 150 to reconfigure the reconfigurable cargo door/tailgate position indicator assembly, the processor 130 outputs a signal to the door/gate position indicator 120 to either change the indication state of the indicator 120 or to indicate that the door/gate 110 is not ajar, when, in fact, the door/gate 110 is ajar. In changing the indication state of the door/gate position indicator 120, the processor 130 is changing the state from the state at which the indicator 120 indicated prior to the processor 130 determining that the user of the vehicle desires to place the reconfigurable cargo door/tailgate position indicator assembly in the "user controlled mode." That is, by way of example, in the just described example, the processor may control the indicator 120 to indicate that the door/gate 110 is ajar prior to analyzing the input from the door/gate monitoring mode input device 150. That is, the state of the indicator 120 is switched from an indication that the gate 110 is ajar to an indication that the gate 110 is not ajar.

In some other embodiments of the invention, the processor 130 is further adapted to output, only if the processor has determined that the door/gate is ajar based on input from the door/gate position input device 140, and then only if the processor has now determined that the output from the door/gate monitoring mode input device 150 is indicative of input into the device 150 to reconfigure the reconfigurable cargo door/tailgate position indicator assembly to signal and/or control the door/gate position indicator 120 to indicate that the door/gate 110 is not ajar.

As can be seen from the above discussion, control of the indicator state of the door/gate position indicator 120 may be based on whether or not the processor 150 has determined that output from the door/gate monitoring mode input device 150 is indicative of input into the device 150 to reconfigure the reconfigurable indicator assembly. In this regard, the processor 130 may include logic that is adapted to make a determination that the output from the door/gate monitoring mode input device 130 is not indicative of input into the device 130 to reconfigure the reconfigurable cargo door/tailgate position indicator assembly if the processor 130 has not determined that output from the door/gate monitoring mode input device 150 is indicative of input into the device 150 to reconfigure the reconfigurable cargo door/tailgate position indicator assembly within a predetermined time period. That is, the processor may include logic to determine that the processor has not determined something. By way of exemplary embodiment, if the door/gate monitoring mode input device 150 is a push button switch, and the processor is configured to determine that a user desires to reconfigure the reconfigurable cargo door/tailgate position indicator assembly based on the actuation of the button five times within five seconds, the processor (which may include a timer or clock) may determine whether or not the button has been pressed five times within five seconds. For example, if the button has been pressed five times within five seconds, the processor will make the determination that the user desires to reconfigure the indicator assembly, whereas if the fifth actuation occurs six seconds after the first actuation and/or six seconds after another predetermined event to start the timer, the processor will reset the timer and will determine that the input is not indicative of a desire of the user to reconfigure the assembly.

In another exemplary embodiment of the present invention, the processor 130 may be adapted to receive input from the door/gate monitoring mode input device 150 and to analyze the input to determine whether a user of the vehicle wants to reconfigure the reconfigurable cargo door/tailgate position indicator assembly, and controls the door/gate position indicator 120 based on the analysis of the input from the door/gate monitoring mode input device 150. In some embodiments of the present invention, the indicator 120 may be entirely controlled by the processor based on input from the door/gate monitoring mode input device 150, as long as the door/gate position indicator 120 may at least sometimes function to indicate the actual position of the door/gate 110.

In another embodiment of the present invention, the reconfigurable cargo door/tailgate position indicator assembly may be configured with a processor 130 that is adapted to receive input from a gear indicator of a vehicle 160 (see FIG. 2) that outputs information indicative of what gear the vehicle 100 is in. The processor 130 may further be adapted to determine whether the input from the gear indicator 160 is indicative of a vehicle in a gear other than the parked gear. In such embodiments, the processor 130 by way of example, may include logic such that the processor will not analyze input from the door/gate monitoring mode input device 150 if the processor determines that the input from the gear indicator 160 is indicative of a vehicle in a gear other than the parked gear. By way of example and not by way of limitation, if the gear indicator 160 outputs a signal to the processor 130 indicative of the vehicle being in, for example, a drive gear, the processor will not analyze input from the door/gate monitoring mode input device 150. Thus, in some embodiments, the reconfigurable cargo door/tailgate position indicator assembly according to the present invention may be configured such that the indicator assembly may only be reconfigured by a user when the vehicle is in the parked gear. In yet other embodiments of the present invention, the processor 130 may include logic such that the door/gate position indicator 120 will output the actual state of the position of the door/gate 110 regardless of what input is received from the door/gate monitoring mode input device 150 if the processor 130 determines that the vehicle is in the parked gear, but if the processor determines that the vehicle is no longer in the parked gear, the processor 130 may control the indicator 120 to indicate that the door/gate 110 is not ajar even if the door/gate 110 is ajar if the processor 130 has determined that a user desires to place the reconfigurable cargo door/tailgate position indicator assembly into the "user controlled mode." That is, the indicator 120 will show the actual state of the door/gate 110 while the vehicle is in the parked gear. This provides an initial indication to the driver that the tailgate is ajar when the driver first enters the vehicle and/or begins to prepare to move the vehicle, but then removes the indicator while the driver is actually moving the vehicle, such that the indicator does not indicate that the tailgate is ajar even if the tailgate is ajar.

Figure 3:
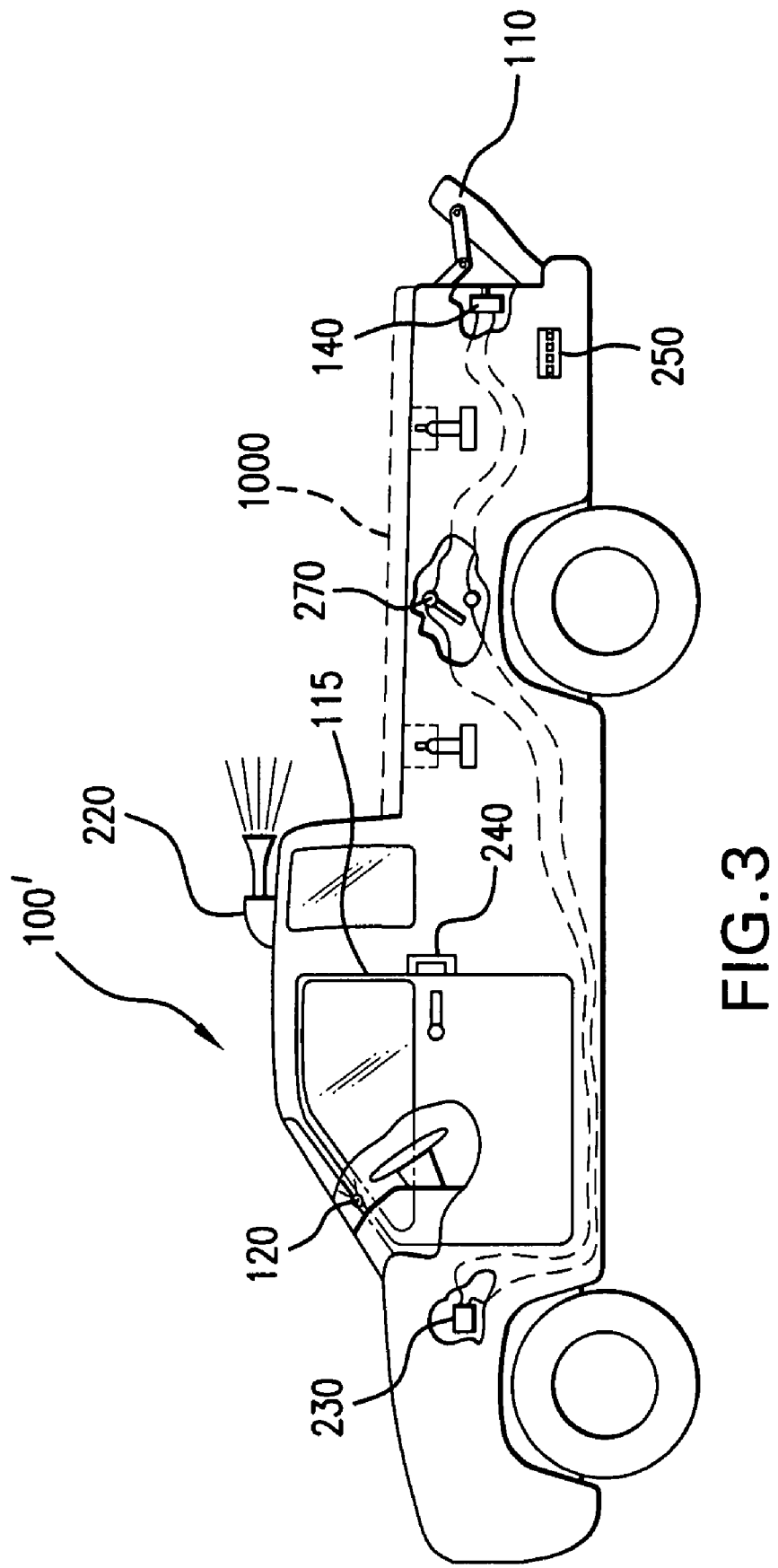
FIG. 3 shows a vehicle utilizing an embodiment of the security device according to the present invention.
Figure 4:
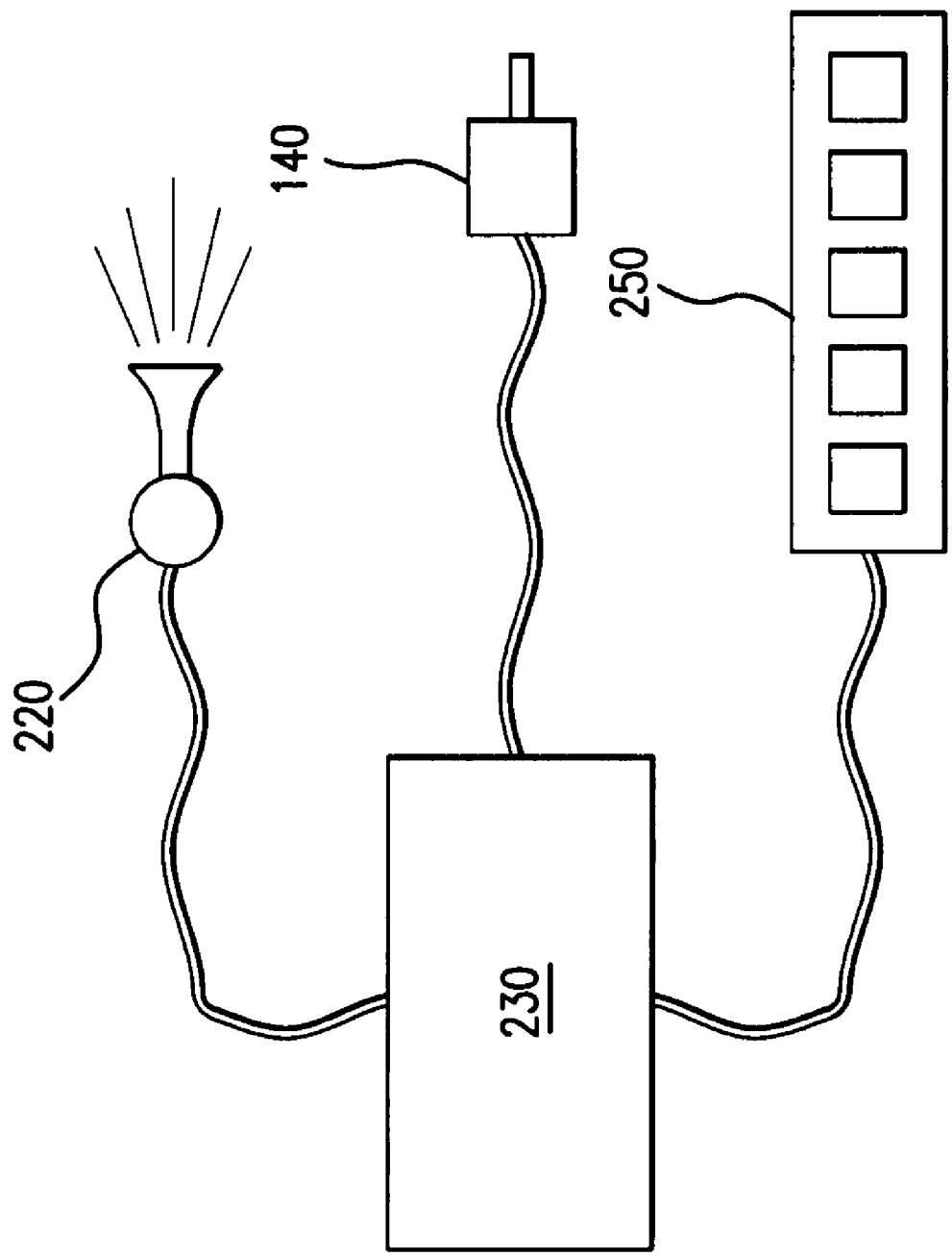
FIG. 4 shows a security device according to an embodiment of the present invention.

In another embodiment of the present invention, there is a reconfigurable security device for a vehicle 100' with a cargo door and/or a tailgate 110 as may be seen in FIGS. 3 and 4. In this embodiment of the present invention, there is a security device that is adapted to monitor the security of the vehicle 100' with a cargo door/tailgate 110' comprising a processor 230 that is adapted to receive input from a door/gate position input device 140, wherein the door/gate position input device 140 is adapted to receive input indicative of whether the cargo door/tailgate 110 is ajar. The processor 230 is further adapted to receive input from a cabin door position input device 240 that is adapted to receive input indicative of whether the cabin door 115 is ajar. The processor 230 is further adapted to receive input from a door/gate security mode input device 250 that is adapted to receive input from a user and output information indicative of a desired mode in which he or she desires the security device to operate. The processor 230 is further adapted to analyze the inputs from some or all of the just mentioned devices.

The processor 230 further includes logic to determine that security of a vehicle has been breached if the received input from the door/gate security mode input device 250 indicates that the processor should consider received input from the door/gate security mode input device 250 indicative of the door/gate being opened/ajar to be indicative of a security breach, and input from the door/gate position input device 110 that the door/gate is open/ajar. That is, the processor 230 receives input from the door/gate security mode input device 250 indicative of a user's desire to operate the security device in a mode such that if the security device receives input from the door/gate position indicator 110 that the door/gate is ajar, the security device determines that the security of the vehicle has been breached. In such instances, the processor may command an alarm 220 or other security breach indicator device to indicate that security has been breached.

The processor 230 further includes logic to determine that the security of the vehicle 100' has been breached if input from the door/gate security mode input device 250 indicates that the processor should consider received input from the door/gate position input device 140 to not be indicative of a security breach, and input from the cabin door position input device 240 is, in fact, indicative of the cabin door 115 being open/ajar. Thus, if the input from the cabin door position input device 240 is indicative of the cabin door 115 being open or ajar, the processor 230 will consider such received input to be indicative of a security breach.

Still further, the processor 230 as described above may further include logic to determine that the security of a vehicle has not been breached if input from the door/gate security mode input device 250 indicates that the processor should consider received input from the door/gate position input device 140 indicative of the door/gate being open/ajar 110 to not be indicative of the security breach, and input from the door/gate position input device 140 is, in fact, indicative of the door/gate 110 being open/ajar, and input from the cabin door position input device 240 is indicative of the cabin door 115 not being open/ajar. That is, if the security system determines that the door/gate 110 is open and/or otherwise ajar but does not determine that the cabin door 115 is open or otherwise ajar, the processor 230 will determine that the security of the vehicle has not been breached, thus permitting the cabin of the vehicle to be protected from theft while permitting the door/gate to be open.

In an embodiment of the security device according to the present invention, the security device may be adapted to be reconfigured by the user/driver of the vehicle. According to some embodiments of the present invention, the security device may be configured to either monitor the position of a vehicle cabin door 115 and/or determine whether a vehicle cabin door 115 is ajar, as well as monitor the position of the cargo door/tailgate 110 and/or determine whether the door/gate 110 is ajar. According to an embodiment of the invention, the security device may be placed in a first mode of operation, by a user, where the security system, which may include a processor 230, may determine that the security of the vehicle 100' has been breached if the security device determines that either the cabin door 115 or the cargo door/tailgate 110 is ajar. That is, in the first mode of operation, only one of the cabin door 115 and the cargo door/tailgate 110 need be ajar for the security device to determine that the security of a vehicle has been breached. For example, if the security device determines that the cabin door 115 is ajar, the security system will determine that the security in the vehicle has been breached. If the security device determines that the cargo door/tailgate 110 is ajar, the security device will also determine that the security of the vehicle has been breached. Still further, in an embodiment of a security device according to the present invention, the security device is further configured to be placed into a second mode of operation where the security device determines that the security of the vehicle has been breached based when the security device determines that the cabin door 115 is ajar. In the second mode, the security device ignores/disregards and/or does not monitor the position of the door/gate 110. That is, in an exemplary scenario of the security system according to the present invention operating in the second mode, if the security device determines that the cabin door 115 is ajar while operating in the second mode, the security device will determine that the security of the vehicle has been breached. However, if the tailgate becomes ajar while operating in the second mode and/or if the security device determines that the cargo door/tailgate 110 has become ajar while operating in the second mode, the security device will not determine that the security of the vehicle 100' has been breached if the security device does not determine that the cabin door 115 is ajar.

In yet other embodiments of the security device according to the present invention, the security device is adapted to operate in yet a third mode of security, where the security device is, in essence, deactivated. That is, if the security device determines that the cabin door 115 is ajar and/or that the door/gate 110 is ajar, the system does not determine that vehicle security has been breached. Alternatively or in addition to this, when operating in the third mode, the security device may disregard/ignore and/or not monitor the position of the door 115 and/or the door/gate 110.

In some embodiments of the security device according to the present invention operating in any of the modes just described includes an action by the security device to determine and/or receive data indicative of the position of the cargo door/tailgate 110 and the cabin door 115. In yet other embodiments of the present invention operating in the various modes, once the security device enters a mode where the position of the door/gate and/or the cabin door no longer influences a change in the determination of whether the security of a vehicle has been breached, the security device operating such modes may not even receive input regarding the position of the door/gate and/or the cabin door. By way of example and not by way of limitation, in a security device operating in the second mode as described above, the security device may not receive any information regarding the position of the door/gate 110 and/or may not determine the position of the door/gate 110. That is, according to such an embodiment, input regarding the position of the door/gate 110 may not be available and/or not used by the security device. Such is also the case with the cabin door 115 when operating, for example, in the third mode.

In some embodiments of the present invention utilizing a security device as described above, the security device may be configured with a device 270 that generates a signal to a processor 230 that is indicative that the door/gate 110 is ajar, and is used by the processor 230 to determine whether the security has been breached, such that the security device will "think" that the door/gate 110 is not ajar when in fact the door/gate 110 is ajar. That is, in some embodiments of the present invention, the above described second mode may be entered by activating a device that outputs a signal so that the security system "thinks" that the door/gate 110 is not ajar when in fact the door/gate 110 may be ajar. In some embodiments, this device 270 could be a switch that closes a circuit that would otherwise be closed when the door/gate is not ajar (and opened when the door/gate is ajar).

In this regard, algorithms according to the present invention which can form the basis for control programs and routines for implementing aspects of the invention are set forth in FIGS. 5-8.

Figure 5:
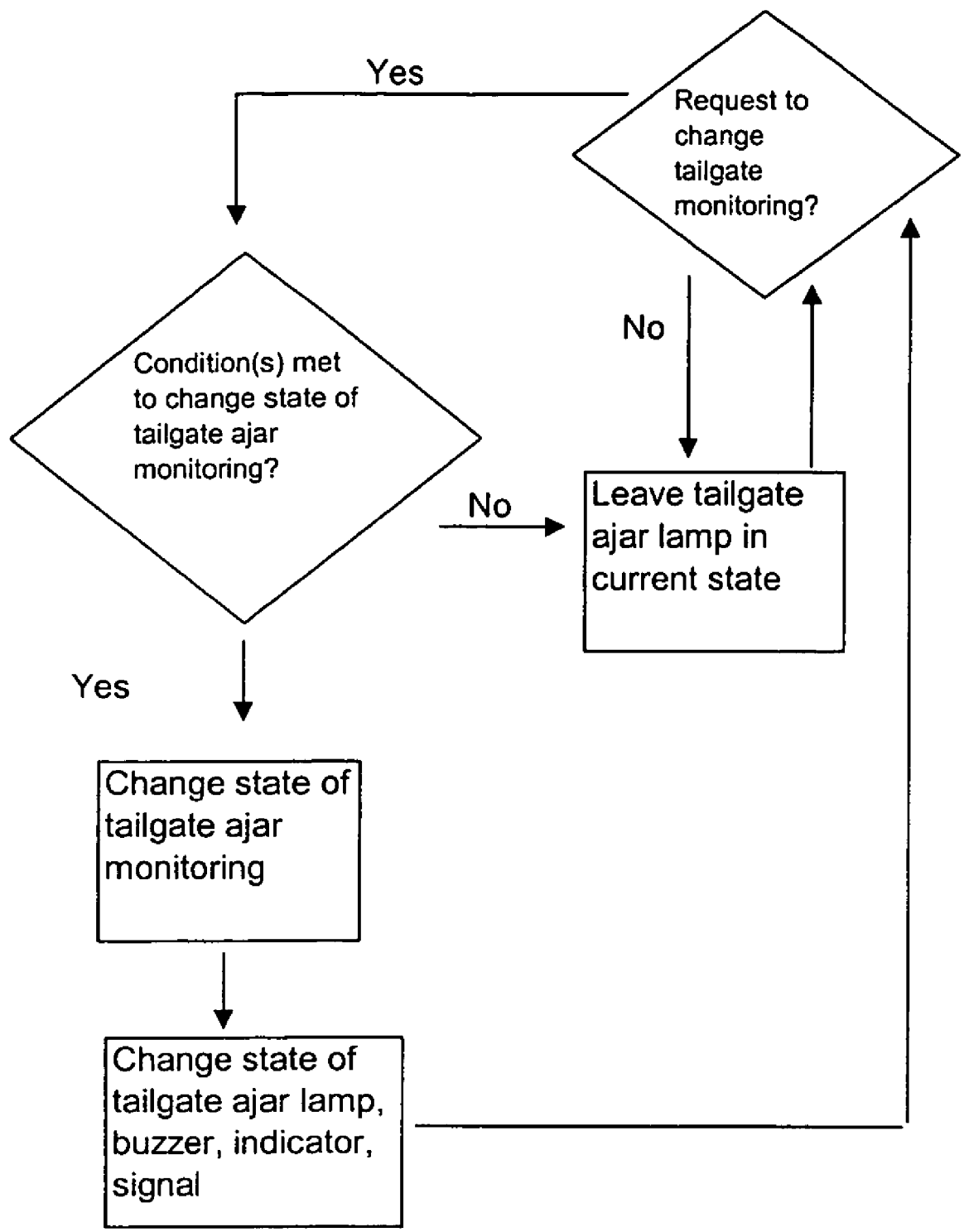
FIG. 5 shows a flow chart for an algorithm according to an embodiment of the invention to reconfigure the cargo door/tailgate position indicator assembly.

FIG. 5 shows a flow chart for an algorithm according to an embodiment of the invention to reconfigure the cargo door/tailgate position indicator assembly.

Figure 6:
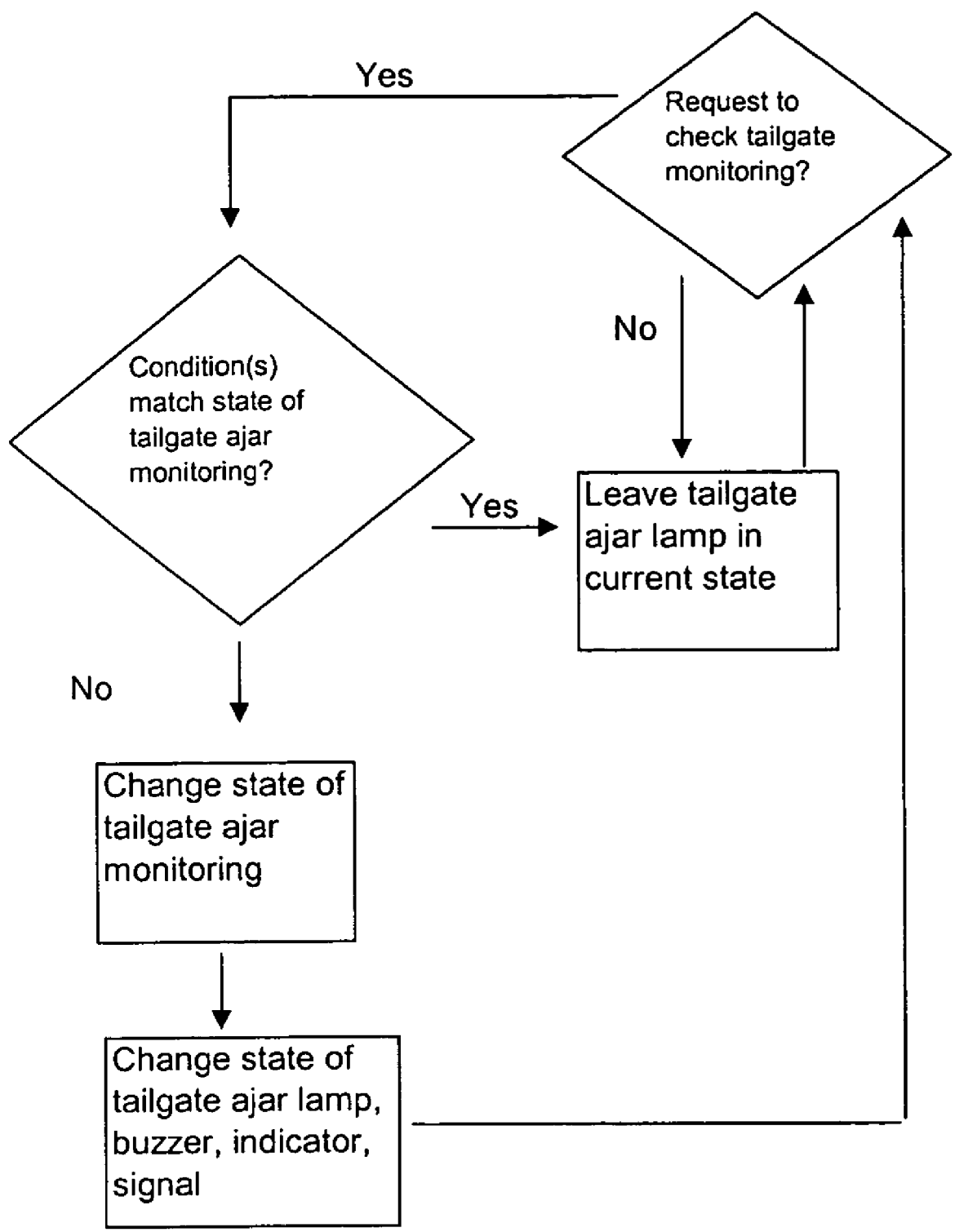
FIG. 6 shows a flow chart for an algorithm according to an embodiment of the invention to check or otherwise determine when the cargo door/tailgate position indicator assembly should be reconfigured.

FIG. 6 shows a flow chart for an algorithm according to an embodiment of the invention to check or otherwise determine when the cargo door/tailgate position indicator assembly should be reconfigured.

Figure 7:
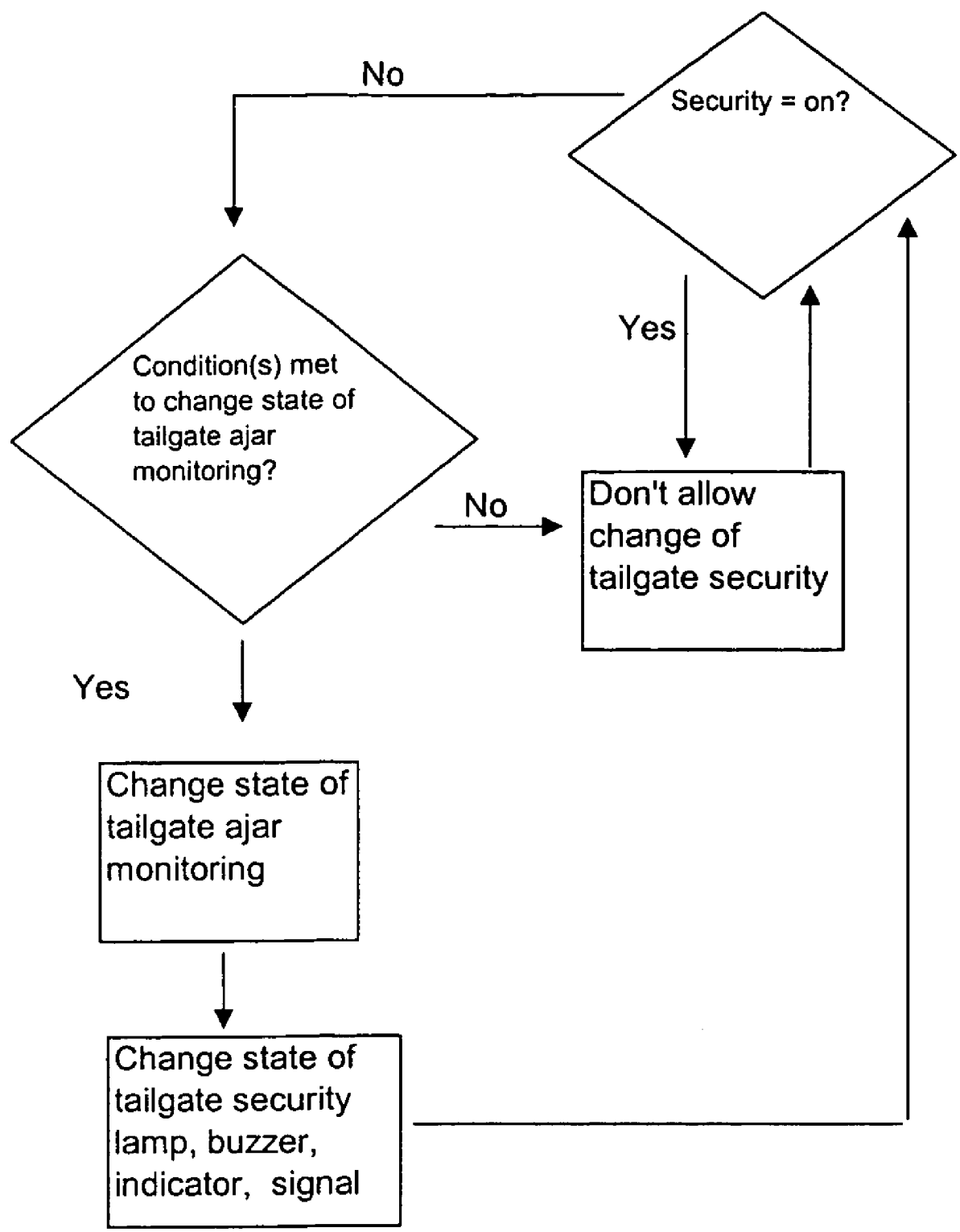
FIG. 7 shows a flow chart for an algorithm according to an embodiment of the invention to reconfigure a security device according to the present invention.

FIG. 7 shows a flow chart for an algorithm according to an embodiment of the invention to reconfigure a security device according to the present invention.

Figure 8:
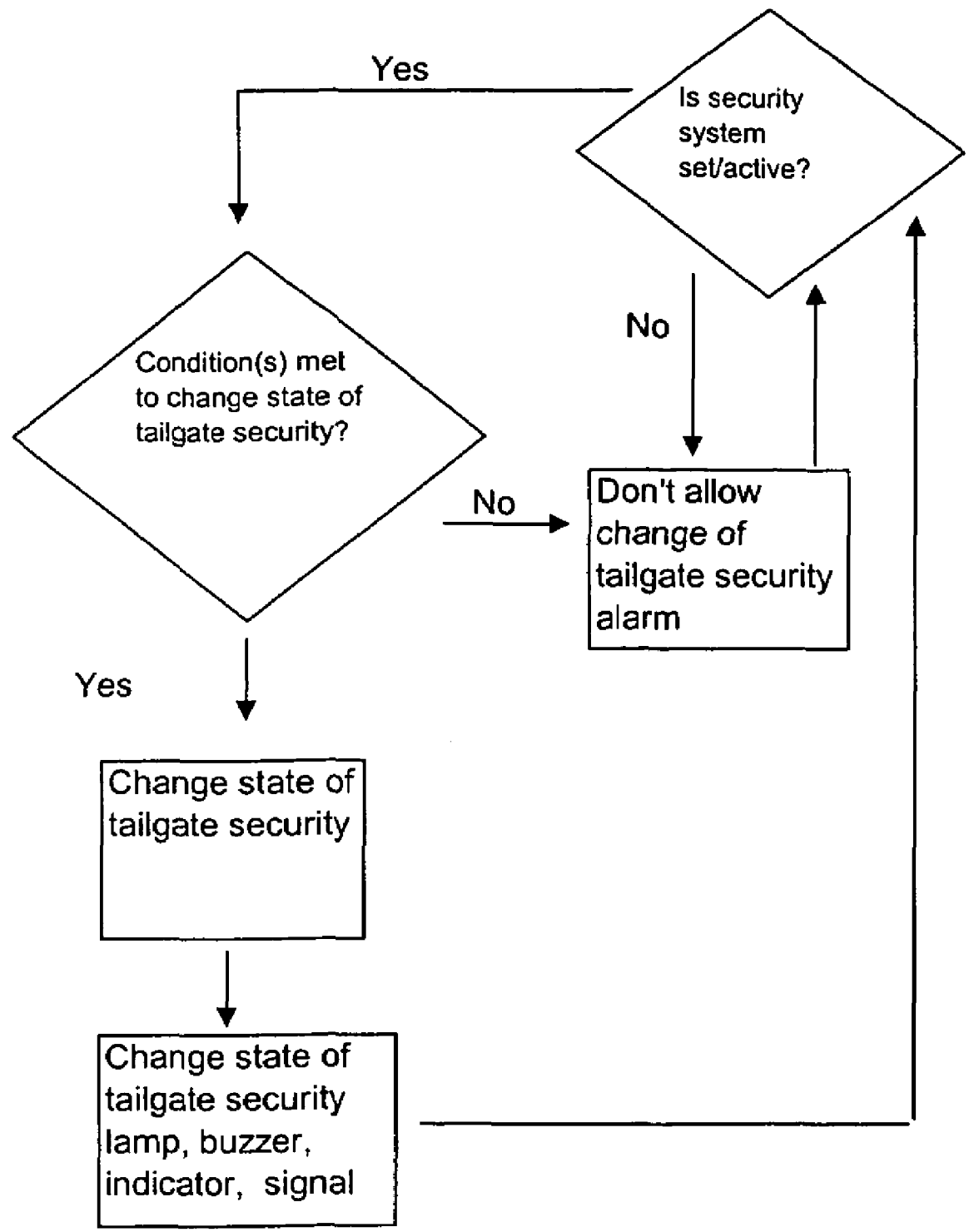
FIG. 8 shows a flow chart for an algorithm according to an embodiment of the invention to check or otherwise determine when the security device should be reconfigured.

FIG. 8 shows a flow chart for an algorithm according to an embodiment of the invention to check or otherwise determine when the security device should be reconfigured.

Figure 10:
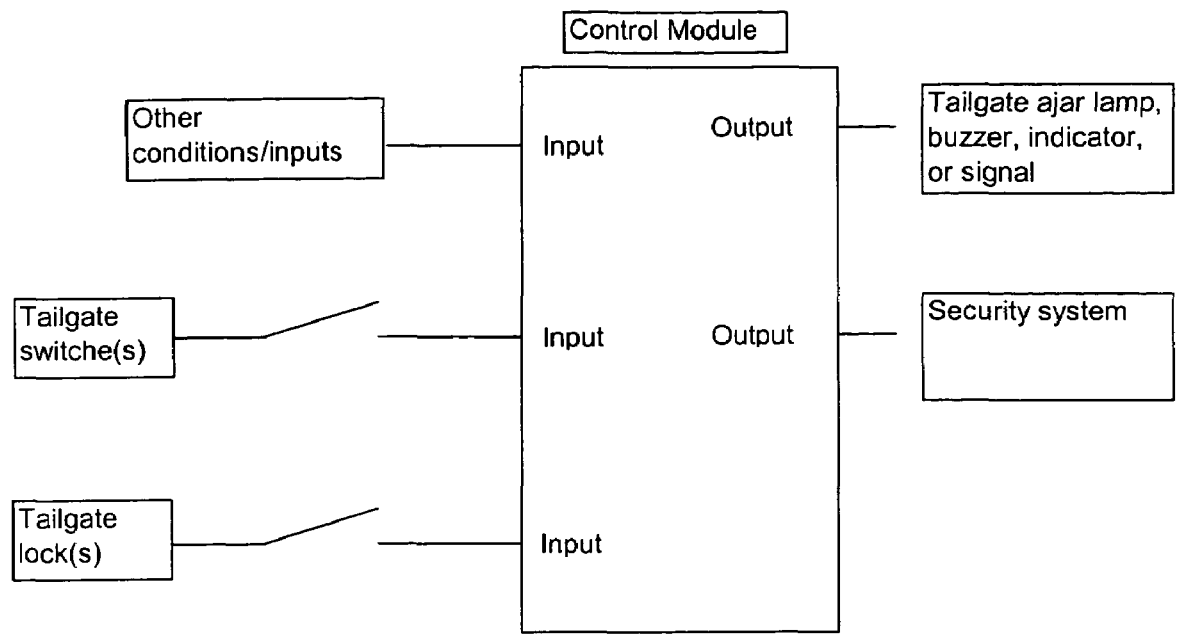
FIG. 10 shows another input-output diagram for a control module/processor according to the present invention.

Some embodiments of the present invention may be practiced by combining a reconfigurable cargo door/tailgate position indicator assembly as described above or below with a reconfigurable security device as described above and below. To this end, FIG. 10 shows an input-output diagram for a processor/module according to an exemplary embodiment combining the two features.

While the Figs. show possible positions of the various components of some embodiments of the present invention, other locations of these components are possible. By way of example, the door/gate monitoring mode input device 150 and/or the door/gate security mode input device 250 may be positioned inside the cabin, and/or embodiments may utilize a plurality of such devices (for example, one device 150 near the door/gate 110 and one device 150 in the cabin, etc.)

In some embodiments of the present invention, the door/gate position indicator 120 may be visual (e.g., light/LED/illuminated characters/illuminated words), audio, etc.

Some embodiments of the present invention include making a vehicle with a reconfigurable cargo door/tailgate position indicator assembly. In an exemplary method embodiment, the method is performed by obtaining a vehicle and installing a reconfigurable cargo door/tailgate position indicator assembly as described above or below onto the vehicle. Still further, some embodiments of the present invention include a method of modifying/retrofitting a vehicle with a standard cargo door/tailgate position indicator assembly to include a reconfigurable cargo door/tailgate position indicator assembly. Such a method includes obtaining a vehicle and modifying the vehicle by installing a modification device on the vehicle so that a user can selectively prevent the door/gate position indicator from indicating that the door/gate is ajar when the door/gate position input device receives input that the door/gate is ajar. In some embodiments of the invention including modification to a vehicle, a switch may be installed on the vehicle so that the switch opens a circuit in which the door/gate position input device is located such that the door/gate position input device cannot indicate that the door/gate is ajar when the door/gate position input device receives input that the door/gate is ajar. Alternatively, the switch may short a circuit in which the door/gate position input device is located such that the door/gate position input device cannot indicate that the door/gate is ajar when the door/gate position input device receives input that the door/gate is ajar.

Some embodiments of the present invention include making a vehicle with a security device. In an exemplary method embodiment, the method is performed by obtaining a vehicle and installing a security device as described above or below onto the vehicle. Still further, some embodiments of the present invention include a method of modifying/retrofitting a vehicle already having (with) a security system to include a security device as described above or below. Such a method includes obtaining a vehicle and modifying the vehicle by installing a modification device on the vehicle so that a user can selectively prevent the security system from determining that vehicle security has been breached when the door/gate is ajar. In some embodiments of the invention including modification to a vehicle, a switch may be installed on the vehicle so that the switch opens a circuit in which the door/gate position input device is located such that the door/gate position input device cannot indicate that the door/gate is ajar when the door/gate position input device receives input that the door/gate is ajar. Alternatively, the switch may short a circuit in which the door/gate position input device is located such that the door/gate position input device cannot indicate that the door/gate is ajar when the door/gate position input device receives input that the door/gate is ajar.

The present invention includes methods to practicing the invention, software to practice the invention, and apparatuses configured to implement the present invention. Accordingly, the present invention includes a program product and hardware and firmware for implementing the algorithms herein, as well as the systems and methods described herein, and also for the control of the devices and implementation of the methods described herein.

Further, it is noted that the term "processor," as used herein, encompasses both simple circuits and complex circuits, as well as computer processors.

Given the disclosure of the present invention, one versed in the art would appreciate that there may be other embodiments and modifications within the scope and spirit of the present invention. For example, in certain applications a separate door/gate monitoring mode input device is not needed because the functions of this device can be performed by a processor (for example, processor 130 or 230). Also, in certain applications the user can reconfigure the monitoring mode while driving or the monitoring mode can be automatically changed based on inputs from the vehicle (for example, based on inputs from the transmission system as to what gear the vehicle is in). The indication as to the position of the door/gate can be made by an audible alarm or other type of indication instead of or in addition to a visual alarm. Accordingly, all modifications within the scope and spirit of the present invention are to be included as further embodiments of the present invention. The scope of the present invention accordingly is to be defined with reference to the appended claims.

What is claimed is:

1. A reconfigurable cargo door/tailgate position indicator assembly adapted to indicate a position of a cargo door and/or a tailgate comprising:
  a processor adapted to:
    receive input from a door/gate monitoring mode input device;
    receive input from a door/gate position input device; and
    control a door/gate position indicator to indicate that the door/gate is ajar and control the door/gate position indicator to indicate that the door/gate is not ajar;
    wherein
  the processor includes logic to:
    analyze the input from the door/gate position input device and determine whether the door/gate is ajar based on the input from the door/gate position input device;
    analyze, only if the processor determines that the door/gate is ajar based on the input from the door/gate position input device, input from the door/gate monitoring mode input device, wherein the analysis of the input from the door/gate monitoring mode input device includes a determination that output from the door/gate monitoring mode input device is indicative of input into the door/gate monitoring mode input device to reconfigure the reconfigurable cargo door/tailgate position indicator assembly;
    output, only if the processor determines that output from the door/gate monitoring mode input device is indicative of input into the door/gate monitoring mode input device to reconfigure the reconfigurable cargo door/tailgate position indicator assembly, a signal to the door/gate position indicator to:
    control the door/gate position indicator to indicate that the door/gate is not ajar;
    place the door/gate position indicator in a mode to indicate that the door/gate is not ajar if the processor determines that the door/gate is not ajar based on the input from the door/gate position input device; and
    place the door/gate position indicator in a mode to indicate that the door/gate is ajar if the processor has determined that the door/gate is ajar based on the input from the door/gate position input device and if the processor has not determined that output from the door/gate monitoring mode input device is indicative of input into the door/gate monitoring mode input device to reconfigure the reconfigurable cargo door/tailgate position indicator assembly.

2. The assembly of claim 1, wherein the processor is further adapted to:
  receive input from a gear indicator; and
  determine whether the input from the gear indicator is indicative of a vehicle in a gear other than the parked gear; wherein
  the logic of the processor is such that the processor does not analyze the input from the door/gate monitoring mode input device if the processor determines that the input from the gear indicator is indicative of a vehicle in a gear other than the parked gear.

3. The assembly of claim 1, wherein the processor is further adapted to:
  output, only if the processor determines that the door/gate is not ajar based on input from the door/gate position input device, the signal to hail the door/gate position indicator to control the door/gate position indicator to indicate that the door/gate is not ajar; and output, only if the processor has determined that the door/gate is ajar based on the input from the door/gate position input device and only if the processor has not determined that output from the door/gate monitoring mode input device is indicative of input into the door/gate monitoring mode input device to reconfigure the reconfigurable cargo door/tailgate position indicator assembly, a signal to the door/gate position indicator to control the door/gate position indicator to indicate that the door/gate is ajar.

4. The assembly of claim 1, wherein the logic is adapted to determine that the processor has not determined that output from the door/gate monitoring mode input device is indicative of input into the door/gate monitoring mode input device to reconfigure the reconfigurable cargo door/tailgate position indicator assembly if the processor has not determined that output from the door/gate monitoring mode input device is indicative of input into the door/gate monitoring mode input device to reconfigure the reconfigurable cargo door/tailgate position indicator assembly within a predetermined time period.

5. The assembly of claim 1, wherein the assembly further includes:

the door/gate monitoring mode input device, the door/gate monitoring mode input device including a switch adapted to output a signal indicative of switch toggling and/or button actuation; wherein the processor is adapted to receive the signal indicative of switch toggling and/or button actuation and determine that receipt by the processor of a predetermined number of signals within a predetermined time period is output from the door/gate monitoring mode input device indicative of input into the door/gate monitoring mode input device to reconfigure the reconfigurable cargo door/tailgate position indicator assembly.

6. An assembly including a reconfigurable cargo door/tailgate position indicator assembly adapted to indicate a position of a cargo door and/or a tailgate and a security device adapted to monitor security of a vehicle with the cargo door/tailgate, the assembly comprising:

a processor adapted to:
  receive input from a door/gate monitoring mode input device;
  receive input from a door/gate position input device;
  receive input from a cabin door position input device;
  receive input from a door/gate security mode input device;
  analyze input from the door/gate monitoring mode input device;
  analyze input from the door/gate position input device;
  analyze input from the cabin door position input device;
  analyze input from the door/gate security mode input device; and
  output a signal to a door/gate position indicator to control the door/gate position indicator based on the analysis of the input from the door/gate monitoring mode input device and the input from the door/gate position input device; wherein the processor includes logic to:
  determine that security of the vehicle has been breached if:
    the input from the door/gate security mode input device indicates that the processor should consider received input from the door/gate position input device indicative of the door/gate being open to be indicative of security breach; and
    the input from the door/gate position input device is indicative of the door/gate being open; and
  determine that the security of the vehicle has been breached if:
    the input from the door/gate security mode input device indicates that the processor should consider received input from the door/gate position input device indicative of the door/gate being open to not be indicative of security breach; and
    the input from the door/gate position input device is indicative of the door/gate being open; and
    input from the cabin door position input device is indicative of the cabin door being open; and
  determine that the security of the vehicle has not been breached if:
    the input from the door/gate security mode input device indicates that the processor should consider received input from the door/gate position input device indicative of the door/gate being open to not be indicative of security breach; and
    the input from the door/gate position input device is indicative of the door/gate being open; and
    input from the cabin door position input device is indicative of the cabin door not being open.

7. A vehicle with a security device adapted to monitor a position of a cabin door and a cargo door and/or a tailgate, comprising:

a vehicle including:
  a cargo door or a tailgate;
  a cabin door;
  a door/gate position input device;
  a cabin door position input device; and
a security device, wherein the security device is adapted to:
  receive input indicative of a user's desire for the security device to operate in at least a first mode of security and a second mode of security and enter a respective mode of security based on the received input indicative of the user's desire to operate in at least the first mode of security and the second mode of security;
  determine, while operating in the first or second mode of security, that the security of the vehicle has been breached based on input from the cabin door position input device indicating that the cabin door is ajar;
  determine, while operating in the first mode of security, that the security of the vehicle has been breached based on input from the door/gate position input device indicating that the door/gate is ajar; and
  determine, while operating in the second mode of security, that the security of the vehicle has not been breached based on input from the door/gate position input device indicating that the door/gate is ajar;
wherein the vehicle further includes a reconfigurable cargo door/tailgate position indicator assembly adapted to indicate the position of the door/tailgate, comprising:
a processor adapted to:
  receive input from a door/gate monitoring mode input device;
  receive input from the door/gate position input device;
  analyze the input from the door/gate monitoring mode input device;
  analyze the input from the door/gate position input device; and
  output a signal to a door/gate position indicator to control the door/gate position indicator based on the analysis of the input from the door/gate monitoring mode input device and the input from the door/gate position input device.

8. The vehicle according to claim 7, wherein the security device is further adapted to:
receive input indicative of at least a third mode of security and enter the third mode of security based on the received input indicative of the third mode of security;
determine, while operating in the third mode of security, that the security of the vehicle has not been breached based on input from the cabin door position input device indicating that the cabin door is ajar or based on input from the door/gate position input device indicating that the door/gate is ajar.

9. A vehicle with a security device adapted to monitor the position of a cabin door and a cargo door and/or a tailgate, comprising:
a vehicle including:
a cargo door or a tailgate;
a cabin door;
a door/gate position input device;
a cabin door position input device; and
a security device, wherein the security device is adapted to:
receive input indicative of a user's desire for the security device to operate in at least a first mode of security and a second mode of security and enter a respective mode of security based on the received input indicative of the user's desire to operate in at least the first mode of security and the second mode of security;
determine, while operating in the either the first or second mode of security, that the security of the vehicle has been breached based on input from the cabin door position input device indicating that the cabin door is ajar;
determine, while operating in the first mode of security, that the security of the vehicle has been breached based on input from the door/gate position input device indicating that the cargo door or tailgate is ajar; and
disregard, while operating in the second mode of security, any output from the door/gate position input device indicative of the cargo door or tailgate being ajar;
wherein the vehicle further includes a reconfigurable cargo door/tailgate position indicator assembly adapted to indicate the position of the door/tailgate, comprising:
a processor adapted to:
receive input from a door/gate monitoring mode input device;
receive input from the door/gate position input device;
analyze the input from the door/gate monitoring mode input device;
analyze the input from the door/gate position input device; and
output a signal to a door/gate position indicator to control the door/gate position indicator based on the analysis of the input from the door/gate monitoring mode input device and the input from the door/gate position input device.

10. The vehicle according to claim 9, wherein the security device is adapted to analyze input from the door/gate position input device indicating that the cargo door or tailgate is ajar; wherein the security device further includes:
a device adapted to generate, while the security device operates in the second mode of security, input substantially replicating input from the door/gate position input device indicating that the cargo door or tailgate is not ajar; wherein
the security device analyzes, while the security device operates in the second mode of security, the input substantially replicating input from the door/gate position input device indicating that the cargo door or tailgate is not ajar instead of input from the door/gate position input device.

11. The vehicle according to claim 10, wherein the security device is adapted to determine that the door/gate is not ajar based on the input substantially replicating input from the door/gate position input device indicating that the cargo door or tailgate is not ajar instead of input from the door/gate position input device when the cargo door or tailgate is actually ajar, and thus determine, while operating in the second mode of security, that the security of the vehicle has not been breached when the cargo door or the tailgate is actually ajar.

12. A method of making a vehicle with a reconfigurable cargo door/tailgate position indicator assembly and a security device, comprising:
obtaining a vehicle, wherein the vehicle includes:
a cargo door or a tailgate;
a cabin door;
a door/gate position input device; and
a security system;
modifying the security system of the vehicle so that the security system of the vehicle is adapted to:
receive input indicative of a user's desire for the security device to operate in at least a first mode of security and a second mode of security and enter a respective mode of security based on the received input indicative of the user's desire to operate in at least the first mode of security and the second mode of security;
determine, while operating in the first or second mode of security, that the security of the vehicle has been breached based on input from a cabin door position input device indicating that the cabin door is ajar;
determine, while operating in the first mode of security, that the security of the vehicle has been breached based on input from the door/gate position input device indicating that the door/gate is ajar; and
determine, while operating in the second mode of security, that the security of the vehicle has not been breached based on input from the door/gate position input device indicating that the door/gate is ajar; and
installing a reconfigurable cargo door/tailgate position indicator assembly onto the vehicle, the reconfigurable cargo door/tailgate position indicator assembly including:
a door/gate position indicator; and
a processor adapted to:
receive input from a door/gate monitoring mode input device;
analyze the input from the door/gate monitoring mode input device; and
output a signal to the door/gate position indicator to control the door/gate position indicator based on the analysis of the input from the door/gate monitoring mode input device; wherein
the reconfigurable cargo door/tailgate position indicator assembly is adapted to indicate to the user whether the cargo door or tailgate is actually ajar utilizing the door/gate position indicator.

13. A method of making a vehicle, comprising:
obtaining a vehicle, wherein the vehicle includes:
a cargo door or a tailgate;

a cabin door;
a door/gate position input device; and
a security system;
modifying the security system of the vehicle, wherein modifying the security system of the vehicle includes:
installing a modification device on the vehicle so that a user can selectively prevent a door/gate position indicator from indicating that the door/gate is ajar when the door/gate position input device receives input that the door/gate is ajar; and
installing a reconfigurable cargo door/tailgate position indicator assembly onto the vehicle, the reconfigurable cargo door/tailgate position indicator assembly including:
the door/gate position indicator; and
a processor adapted to:
receive input from a door/gate monitoring mode input device;
analyze the input from the door/gate monitoring mode input device; and
output a signal to the door/gate position indicator to control the door/gate position indicator based on the analysis of the input from the door/gate monitoring mode input device; wherein
the reconfigurable cargo door/tailgate position indicator assembly is adapted to indicate to a driver of the vehicle whether the cargo door or tailgate is actually ajar utilizing the door/gate position indicator.

14. The method of claim 13, wherein the modification device comprises a switch, and wherein the method further includes:
installing the switch on the vehicle so that the switch at least one of:
opens a circuit in which the door/gate position input device is located such that the door/gate position input device cannot indicate that the door/gate is ajar when the door/gate position input device receives input that the door/gate is ajar; and
shorts the circuit in which the door/gate position input device is located such that the door/gate position input device cannot indicate that the door/gate is ajar when the door/gate position input device receives input that the door/gate is ajar.

15. A program product embedded in a computer-readable medium for reconfiguring a cargo door/tailgate position indicator assembly, comprising:
machine-readable program code on a computer-readable medium for causing, when executed, a machine to perform the following method actions:
analyze input from a door/tailgate monitoring mode input device;
analyze input from a door/tailgate position input device; and
output a signal to a door/tailgate position indicator to control the door/tailgate position indicator based on the analysis of the input from the door/tailgate monitoring mode input device and the input from the door/tailgate position input device.

16. The program product of claim 15, wherein, when executed, the program product further causes the machine to perform the following method actions:
analyze the input from the door/tailgate position input device and determine that the door/tailgate is ajar based on the input from the door/tailgate position input device; and
output a signal to the door/tailgate position indicator to control the door/tailgate position indicator to indicate that the door/tailgate is not ajar when the processor determines that the door/tailgate is ajar.

17. A program product embedded in a computer-readable medium for reconfiguring a cargo door/tailgate position indicator assembly and a security system, comprising:
machine-readable program code on a computer-readable medium for causing, when executed, a machine to perform the following method actions:
analyze input from a door/tailgate position input device;
analyze input from a cabin door position input device;
analyze input from a door/tailgate security mode input device;
analyze input from a door/tailgate monitoring mode input device;
output a signal to a door/tailgate position indicator to control the door/tailgate position indicator based on the analysis of the input from the door/tailgate monitoring mode input device and the input from the door/tailgate position input device;
determine that security of a vehicle has been breached if:
the input from the door/tailgate security mode input device indicates that the machine should consider received input from the door/tailgate position input device indicative of the door/tailgate being open to be indicative of security breach; and
the input from the door/tailgate position input device is indicative of the door/gate being open;
determine that the security of the vehicle has been breached if:
the input from the door/tailgate security mode input device indicates that the machine should consider received input from the door/tailgate position input device indicative of the door/tailgate being open to not be indicative of security breach; and
the input from the door/tailgate position input device is indicative of the door/tailgate being open; and
input from the cabin door position input device is indicative of the cabin door being open; and
determine that the security of the vehicle has not been breached if:
the input from the door/tailgate security mode input device indicates that the machine should consider received input from the door/tailgate position input device indicative of the door/tailgate being open to not be indicative of security breach; and
the input from the door/tailgate position input device is indicative of the door/tailgate being open; and
input from the cabin door position input device is indicative of the cabin door not being open.

18. A vehicle with a security device configured to monitor a position of a passenger area closure member and a cargo area closure member, comprising:
a vehicle including:
a cargo area closure member;
a passenger area closure member; and
a security device, wherein the security device is configured to:
monitor a position of the passenger area closure member and the cargo area closure member;
operate in at least a first mode of security and a second mode of security and enter a respective mode of security based on received input indicative of a command to operate in at least the first mode of security and the second mode of security;
determine, while operating in the first mode of security, that the security of the vehicle has been breached based on at least one of the passenger area closure member and the cargo area closure member being ajar; and determine, while operating in the second mode of security, that the security of the vehicle has been breached based on the passenger area closure member being ajar regardless of the position of the cargo area closure member.

19. The vehicle with a security device configured to monitor a position of a passenger area closure member and a cargo area closure member according to claim 18, wherein the vehicle further includes a reconfigurable cargo area closure member monitoring device having a position indicator configured to indicate a position of the cargo area closure member.

20. The vehicle with a security device configured to monitor a position of a passenger area closure member and a cargo area closure member according to claim 19, wherein the reconfigurable cargo area closure member monitoring device is configured to receive input from a user directing the position indicator to indicate a position of the cargo area closure member, and wherein the reconfigurable cargo area closure member position indicator is configured to receive input from a user reconfiguring the cargo area closure member monitoring device to indicate that the cargo area closure member is closed regardless of the position of the cargo area closure member.

21. The vehicle with a security device configured to monitor a position of a passenger area closure member and a cargo area closure member according to claim 19, wherein the vehicle further includes a signal generator configured to output a signal to the cargo area closure member monitoring device to direct the position indicator to indicate that the cargo area closure member is closed when input from a user reconfigures the cargo area closure member monitoring device.

22. The vehicle with a security device configured to monitor a position of a passenger area closure member and a cargo area closure member according to claim 19, wherein the cargo area closure member monitoring device is configured to receive input from a user reconfiguring the cargo area closure member monitoring device to deactivate the position indicator.

23. The vehicle with a security device configured to monitor a position of a passenger area closure member and a cargo area closure member according to claim 18, wherein the vehicle further includes a cargo area closure member position sensor configured to sense the position of the cargo area closure member.

24. The vehicle with a security device configured to monitor a position of a passenger area closure member and a cargo area closure member according to claim 23, wherein the vehicle further includes a signal generator configured to direct the cargo area closure member position sensor to indicate that the cargo area closure member is closed regardless of the position of the cargo area closure member when operating in the second mode of security.

25. The vehicle with a security device configured to monitor a position of a passenger area closure member and a cargo area closure member according to claim 18, wherein the vehicle further includes a passenger area closure member position sensor configured to sense a position of the passenger area closure member.

26. The vehicle with a security device configured to monitor a position of a passenger area closure member and a cargo area closure member according to claim 18, wherein the vehicle includes a transmission gear position sensor configured to determine a gear position of a transmission, and wherein the security device is configured to enter the first mode of security when the transmission gear position sensor senses that the vehicle is in a parked gear.

27. The vehicle with a security device configured to monitor a position of a passenger area closure member and a cargo area closure member according to claim 18, wherein the vehicle includes a transmission gear position sensor configured to determine a gear position of a transmission, wherein the vehicle further includes a cargo area closure member monitoring device configured to indicate the position of the cargo area closure member, and wherein the cargo area closure member monitoring device is activated to indicate that the cargo area closure member is ajar upon a determination that the cargo area closure member is ajar and the transmission gear position sensor senses that the vehicle is in a parked gear.

28. The vehicle with a security device configured to monitor a position of a passenger area closure member and a cargo area closure member according to claim 18, wherein the vehicle includes a user input device to receive input from a user to enter at least one of the first mode of security and the second mode of security.

29. The vehicle with a security device configured to monitor a position of a passenger area closure member and a cargo area closure member according to claim 18, wherein the vehicle further includes a reconfigurable cargo area closure member monitoring device configured to indicate a position of the cargo area closure member, comprising:

a processor configured to:
receive input from a cargo area closure member monitoring mode input device;
receive input from a cargo area closure member position input device;
analyze the input from the cargo area closure member monitoring mode input device;
analyze the input from the cargo area closure member position input device; and
output a signal to a position indicator to control the position indicator based on the analysis of the input from the cargo area closure member monitoring mode input device and the input from the cargo area closure member position input device.

* * * * *